(12) United States Patent
Oriet

(10) Patent No.: US 8,594,934 B2
(45) Date of Patent: Nov. 26, 2013

(54) SYSTEM AND METHOD FOR SETTING A BUS ROUTE FOR TRANSPORTING PASSENGERS

(75) Inventor: Leo P Oriet, Rochester Hills, MI (US)

(73) Assignee: Navistar Canada, Inc. (CA)

( * ) Notice: Subject to any disclaimer, the term of this patent is extended or adjusted under 35 U.S.C. 154(b) by 0 days.

(21) Appl. No.: 13/583,368

(22) PCT Filed: Mar. 8, 2010

(86) PCT No.: PCT/US2010/026510
§ 371 (c)(1),
(2), (4) Date: Sep. 7, 2012

(87) PCT Pub. No.: WO2011/112174
PCT Pub. Date: Sep. 15, 2011

(65) Prior Publication Data
US 2013/0024114 A1    Jan. 24, 2013

(51) Int. Cl.
*G01S 1/00* (2006.01)
*G08B 1/08* (2006.01)
*G08G 1/123* (2006.01)
*H04M 1/00* (2006.01)

(52) U.S. Cl.
USPC .... 701/491; 340/539.13; 340/994; 455/575.9

(58) Field of Classification Search
USPC ............ 701/491; 340/539.13, 994; 455/575.9
See application file for complete search history.

(56) References Cited

U.S. PATENT DOCUMENTS

| 4,325,057 | A | 4/1982 | Bishop | |
|---|---|---|---|---|
| 5,648,770 | A * | 7/1997 | Ross | 340/994 |
| 6,510,383 | B1 | 1/2003 | Jones | |
| 6,963,796 | B2 | 11/2005 | Larson et al. | |
| 7,030,781 | B2 | 4/2006 | Jones | |
| 7,233,240 | B2 * | 6/2007 | Phillips | 340/539.13 |
| 7,616,978 | B2 * | 11/2009 | Piekarz | 455/575.9 |
| 2005/0065684 | A1 | 3/2005 | Larson et al. | |
| 2006/0017564 | A1 * | 1/2006 | Phillips | 340/539.13 |
| 2007/0112509 | A1 | 5/2007 | Kikuchi et al. | |
| 2008/0195428 | A1 | 8/2008 | O'Sullivan | |
| 2013/0024114 | A1 * | 1/2013 | Oriet | 701/491 |

\* cited by examiner

*Primary Examiner* — Thomas Black
*Assistant Examiner* — Tyler Paige
(74) *Attorney, Agent, or Firm* — Jeffrey P. Calfa; Mark C. Bach

(57) ABSTRACT

A method of setting a bus route for a bus includes the step of providing a global positioning system (GPS) device (100) on the bus (12), and reading passenger data corresponding to a passenger. The passenger data is read from a passenger identification card and transmitted to the GPS device (16). The method further includes the step of matching the passenger data with a bus stop (28), and generating a bus route with the GPS device (100) based on the passenger data (34). Only bus stops that match passenger data are included in the bus route (34).

11 Claims, 2 Drawing Sheets

SYSTEM AND METHOD FOR SETTING A BUS ROUTE FOR TRANSPORTING PASSENGERS

BACKGROUND

Embodiments described herein relate to a system and method for setting a bus route that is dependent upon the passengers embarking the bus.

School buses transport passengers from point to point, typically picking up or dropping off passengers at locations along a route, and dropping off or picking up passengers from school. Passenger ridership of school buses can vary, for example passenger ridership may be greater in the morning than in the afternoon, and passenger ridership may be greater in the middle of the week than in the beginning and end of the week. Even when passenger ridership is down, the bus traverses the entire bus route regardless of whether there are passengers on the bus that will disembark at locations along the entire route, and sometimes the bus stops at each designated bus stop regardless of whether there are passengers on the bus that will disembark at the given bus stop.

In addition to operating the bus, the task of verifying whether passengers embark and disembark from the school bus is typically handled by the bus driver. Bus drivers often develop a familiarity with the passengers and know where the passengers embark and disembark, particularly on school bus routes where the passengers tend to be regular passengers. When the bus driver is absent, the substitute driver may not have a familiarity with the bus route, with the location of the bus stops, or with the passengers. Additionally, when passenger ridership is low, the substitute driver may not know how the route can be shortened to eliminate stops that have no passengers disembarking.

To balance the transport of all passengers, while at the same time minimizing the time and cost to deliver the passengers, school bus passenger route planning typically recognizes where potential passengers are located, and determines a fixed bus route according to where the potential passengers are located. Typical school bus passenger route planning does not reconcile and adjust the bus route according to the actual passengers that embark the bus.

SUMMARY

A method of setting a bus route for a bus includes the steps of providing a global positioning system (GPS) device on the bus, and reading passenger data corresponding to a passenger. The passenger data is read from a passenger identification card and transmitted to the GPS device. The method further includes the step of matching the passenger data with a bus stop, and generating a bus route with the GPS device based on the passenger data. Only bus stops that match passenger data are included in the bus route.

Another method of setting a bus route for a bus includes the steps of providing a global positioning system (GPS) device on the bus, and reading passenger data corresponding to a passenger. The passenger data is transmitted from a passenger identification card to the GPS device. The passenger data includes at least one passenger address. The method also includes the steps of designating the passenger address as a bus stop, and generating a bus route with the GPS device based on the passenger addresses, wherein all bus stops on the bus route are determined by the passenger addresses.

A system for setting a bus route for a bus includes a passenger identification card, a card reader and a global positioning system (GPS) device disposed on the bus. The passenger identification card contains passenger data corresponding to the passenger embarking the bus. The card reader reads the passenger data from the passenger identification card. The GPS device receives the passenger data read by the card reader and generates a bus route based on the passenger data. All bus stops on the bus route are determined by the passenger data.

DETAILED DESCRIPTION

Figure 1:
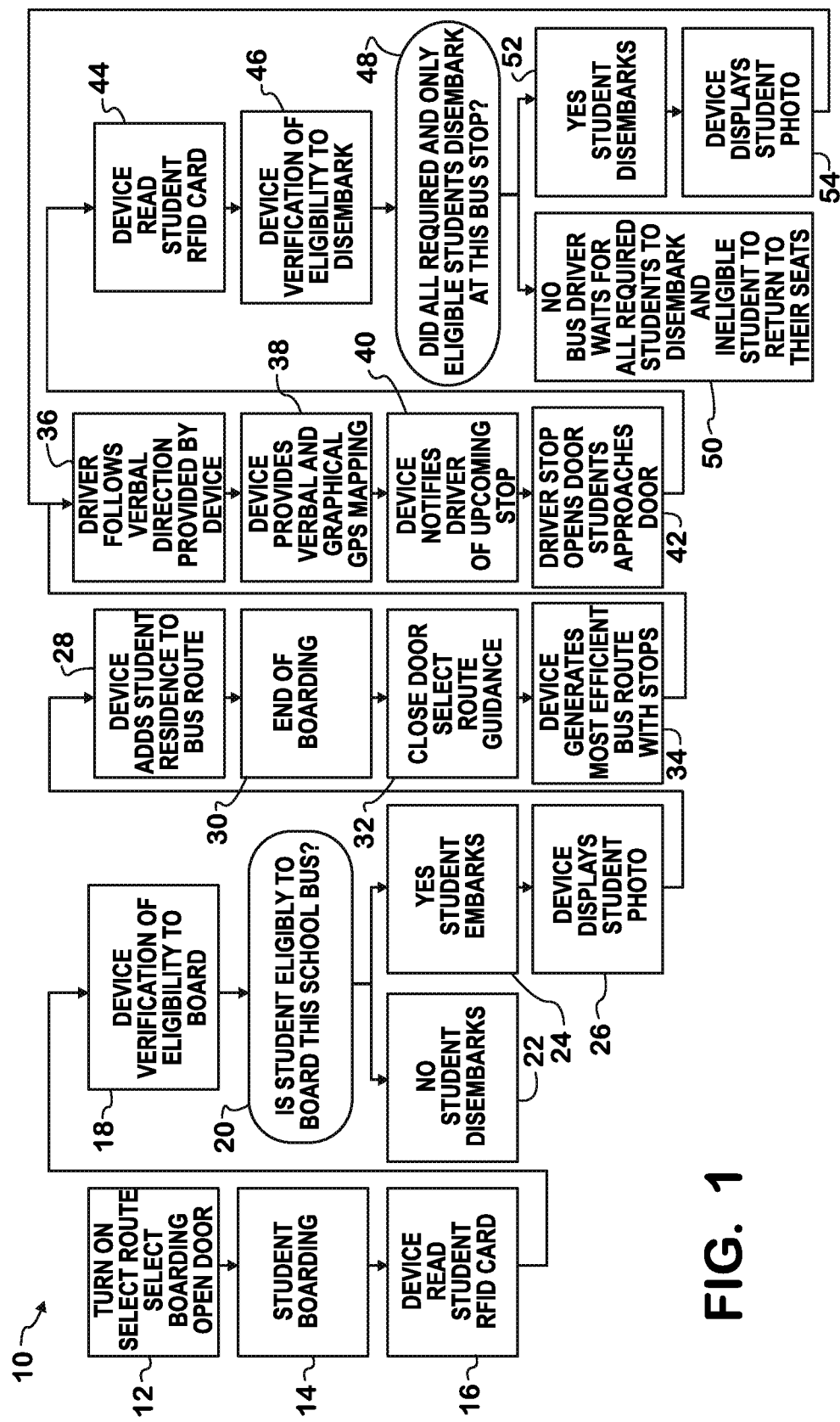
FIG. 1 is a flow diagram showing the system and method of setting a route for delivery of bus passengers.
Figure 2:
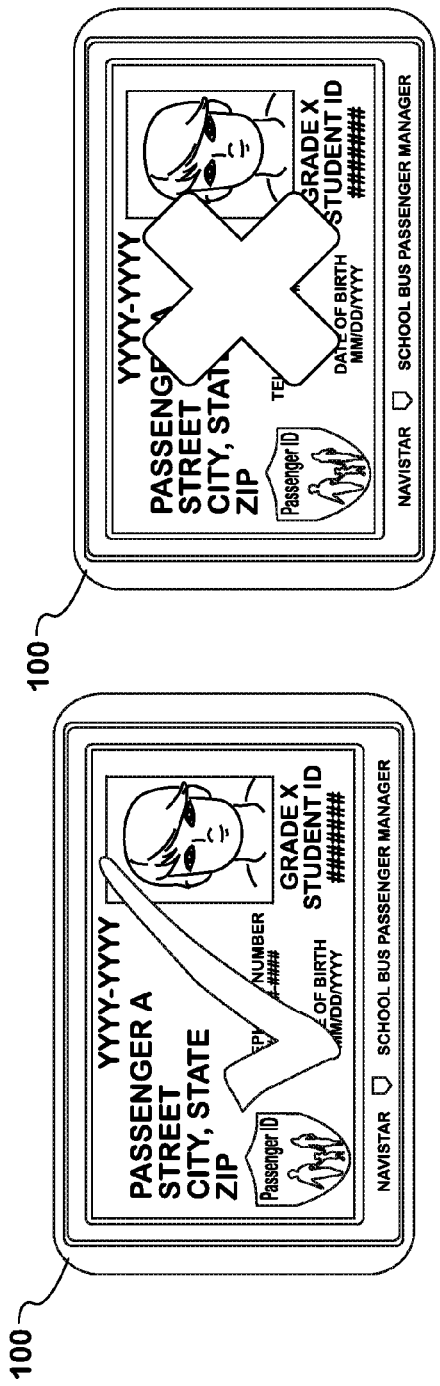
FIG. 2 is an image of a portable GPS device displaying two possible outcomes of an eligibility determination step of FIG. 1.
Figure 3:
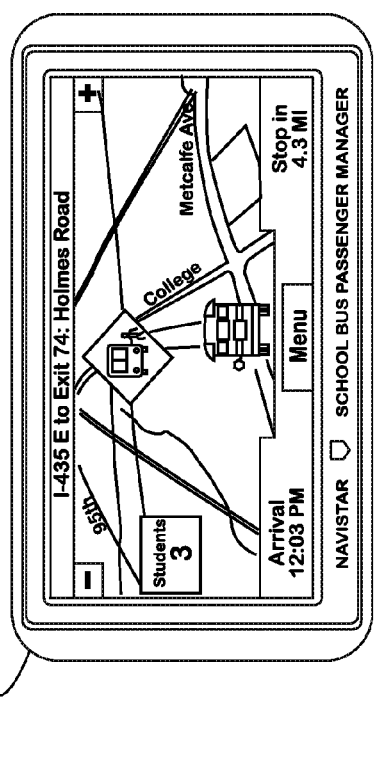
FIG. 3 is an image of a portable GPS device having a mapping graphic that is determined by passenger embarkment data.

Referring to FIGS. 1-3, a system and method for setting a route for delivery of bus passengers is indicated generally at 10. The system and method are implemented by software on a portable device 100, such as a GPS portable device. The GPS device can be a stand-alone subscription free unit or it may be tied to a centrally monitored tracking system. Although the following description will be directed to student passengers on a school bus, the system and method of FIG. 1 can be used on other vehicles that transport passengers. Further, it is possible that the system and method can be implemented in numerous ways on numerous devices, and with a different number and order of steps.

The method starts at start step 12 by turning on the device 100, and selecting a route if there is more than one route available, selecting a boarding if there is more than one boarding available, and opening the bus door. At student boarding step 14, students board the bus. The students have a student identification card that contains student data. The student data can include the identity of the student, a photo of the student, the address of the student, the identification of the bus the passenger is authorized to board and whether disembarkment of the student is mandatory or discretionary at a particular stop, among other possible types of data. The address may be a residential address or any other address where the student is to disembark. The student data is read at embarkment of the student onto the bus.

At data read step 16, the student data from the student identification card is uploaded and read by a card reader, such as an internal radio frequency card reader, when the student identification card is within a predetermined read range of the card reader. The read range of the card reader may be about 6-feet, however other ranges are possible. It is possible that the student identification card does not have to be presented to the card reader, but instead may be concealed in passenger pockets or bags. The card reader may be incorporated in the portable device 100, may be a fixture on the bus, or may be attachable or in selective communication with the portable device. The card reader and/or the portable device 100 can be located in the front of the bus, both in view of the driver and near the door. One or more additional card readers can be located near rear doors of the bus.

The data transmitted from the student identification card to the card reader is downloaded and stored, for example at the portable device or at any other data storage device. The data that is downloaded and stored is used to verify and determine whether the student is eligible to board the bus at a verification step 18 and an eligibility step 20.

If the student data indicates an address that is off the route, indicates the student has not pre-paid for the bus, or any other data that indicates that the student should not embark the bus, the portable device notifies the bus driver of an ineligible student that is embarking at step 22. The portable device 100 may display a photo of the student as being rejected (see FIG. 2). Alternatively, a separate display or an audible indicator can be used to notify the bus driver of the ineligible student. The bus driver can then have the student disembark the bus, and may provide the correct bus number or identification to the student based on the GPS display. If the GPS database indicates that the student is not registered at the school, the driver can have the student report to the school attendant for further direction. If the student data indicates that the student is an eligible student, the student information is validated at step 24 and the student is permitted to embark the bus. The portable device 100 may display a photo of the student as being accepted (see FIG. 2) at step 26. The display of the photo allows the bus driver to verify that the authorized student boarding corresponds to the student identification card.

At step 28, the portable device 100 matches the student address with a predetermined bus stop, or alternatively, adds or designates the student address as a bus stop along the bus route. When all students have embarked the bus, boarding ends at step 30 and the bus doors close. Either automatically or at the selection of the bus driver or other user, route plotting is initiated at step 32.

After initiation, the bus route is generated by the portable device 100 at step 34 based on the student data collected upon embarkment of the bus. Specifically, the student address is used to determine the bus route, which may be the shortest distance route, the route that takes the shortest amount of time, or the route that avoids construction or busy streets, among other criteria for plotting the route.

When the bus route has been determined, the driver follows the audible and/or visual display direction provided by the portable device 100 at step 36 to drive the bus route. FIG. 3 shows the graphical GPS mapping that may be provided by the portable device 100 at step 38.

When the bus approaches a bus stop, the bus driver is notified, such as with an audible and/or visual indication, of the upcoming bus stop at step 40. The names of the students to disembark at the stop may also be indicated to the bus driver. When the driver arrives at the stop and opens the doors at step 42, the student or students approach the door to disembark. When the student or students approach the door, the card reader reads the student data on the student identification card at step 44. At step 46, the portable device 100 compares the student data on the identification card with location of the stop, and verifies whether the student is eligible to disembark at the stop.

The portable device informs the bus driver of any discrepancies, for example if a student is attempting to disembark at a stop that is not the stop matched to the student's address. The student information may be displayed at the portable device 100 when the student is ineligible to disembark, eligible to disembark, or both. At step 48, the portable device 100 determines whether all eligible students and only eligible students disembarked from the bus at the particular bus stop. The date and time of the student disembarkment may be recorded in the GPS database memory for future retrieval by the bus fleet and school in the event of a missing student. If the answer is no, then the bus driver waits for all eligible students to disembark and waits for all ineligible students to be seated at step 50. If the answer is yes, then eligible students are permitted to disembark at step 52, and the portable device 100 may display the student data, such as a photo of the student, at step 54.

Upon completion of disembarking of eligible students at the particular stop, the method loops to step 36 where the driver follows the direction of the portable device 100 to the next bus stop until all students have disembarked the bus.

The route setting system 10 incorporates the portable device 100 and the card reader, which may be integrated with the portable device or separate, both of which can be implemented on existing buses with little to no vehicle modifications. The portable device 100 can plug into an outlet on the bus, and does not need wireless network accessibility. Alternatively, the device 100 of the route setting system 10 can be embodied as a fixture of the bus. The device can be stand-alone subscription free, and can be centrally monitored by bus fleet companies and school boards.

The route setting system and method 10 alerts the driver when a student embarks an incorrect bus, when a student disembarks at an incorrect stop, or when a student fails to disembark at the correct stop. Additionally, bus drivers may be warned of upcoming stops or may be warned when stops are missed.

The system and method 10 avoids making stops, such as predetermined stops along a bus route, where no students will disembark by only including bus stops on the bus route that match passenger data. The stops on the bus route are determined by the at least one student address that is obtained upon embarkment of the bus. Alternately, if there are no predetermined stops, only stops that correspond to the passenger addresses are made. As a result of avoiding stops, time and fuel may be conserved. Further, the system and method 10 can be used to collect bus usage data that can be used to tailor bus routes.

What is claimed is:

1. A method of setting a bus route for a bus, the method comprising the steps of:
   providing a global positioning system (GPS) device on the bus;
   reading passenger data corresponding to a passenger from a passenger identification card and transmitting the passenger data to the GPS device;
   matching the passenger data with a bus stop;
   generating a bus route with the GPS device based on the passenger data, wherein only bus stops that match passenger data are included in the bus route; and
   displaying a photo of the passenger.

2. The method of claim 1 wherein the passenger data is a passenger address.

3. The method of claim 1 wherein the passenger data is read with a radio frequency card reader.

4. The method of claim 1 further comprising the step of notifying a user that the passenger is one of eligible to board the bus and not eligible to board the bus.

5. The method of claim 1 further comprising the step of verifying from the passenger data whether the passenger is eligible to board the bus, wherein if the passenger is eligible to board the bus, the passenger data from the passenger identification card is matched with the bus stop.

6. The method of claim 1 wherein passenger data is read at passenger embarkment of the bus.

7. The method of claim 1 wherein the bus route is generated by the GPS device on the basis of one of the shortest distance route, the route that takes the shortest amount of time, and the route that avoids construction.

8. The method of claim 1 further comprising the step of providing directions with at least one of an audible and a visible display from the GPS device to a user.

9. The method of claim 1 further comprising the step of notifying a user of the bus stop when the bus is approaching the bus stop with at least one of an audible and a visible display from the GPS device.

10. The method of claim 9 further comprising the step of indicating the passenger data of the passengers to disembark at the bus stop.

11. The method of claim 10 further comprising the steps of reading the passenger data as the passenger disembarks the bus, comparing the passenger data with the bus stop, and verifying whether the passenger is eligible to disembark at the bus stop.

* * * * *